US007402290B2

(12) United States Patent
Hubbell et al.

(10) Patent No.: US 7,402,290 B2
(45) Date of Patent: Jul. 22, 2008

(54) CONDENSATION REDUCTION IN FLUID MIXING

(75) Inventors: Douglas S. Hubbell, Sudbury, MA (US); Dino Pizzelli, Hingham, MA (US); Edward P. Hunt, North Attleboro, MA (US); Glenn D. Nasman, Westwood, MA (US)

(73) Assignee: Stone & Webster Process Technology Inc., Houston, TX (US)

( * ) Notice: Subject to any disclaimer, the term of this patent is extended or adjusted under 35 U.S.C. 154(b) by 616 days.

(21) Appl. No.: 10/520,069

(22) PCT Filed: Jul. 2, 2003

(86) PCT No.: PCT/US03/21007

§ 371 (c)(1),
(2), (4) Date: Jan. 3, 2005

(87) PCT Pub. No.: WO2004/004877

PCT Pub. Date: Jan. 15, 2004

(65) Prior Publication Data

US 2005/0249649 A1    Nov. 10, 2005

(51) Int. Cl.
*B01J 3/00* (2006.01)
*F02M 15/02* (2006.01)

(52) U.S. Cl. .............. 422/242; 422/226; 422/293; 261/133; 261/18.1; 261/56; 261/57

(58) Field of Classification Search ............. 261/18.1, 261/56, 57, 113, 123, 133; 422/288, 242, 422/226, 291; 366/101; 159/43.2
See application file for complete search history.

(56) References Cited

U.S. PATENT DOCUMENTS

| 4,344,479 | A |   | 8/1982  | Bailey          |         |
|-----------|---|---|---------|-----------------|---------|
| 5,042,501 | A | * | 8/1991  | Kenny et al.    | 600/532 |
| 5,461,179 | A |   | 10/1995 | Chen et al.     |         |
| 5,686,369 | A |   | 11/1997 | Chen et al.     |         |
| 5,695,724 | A |   | 12/1997 | Chen et al.     |         |
| 5,739,071 | A |   | 4/1998  | Chen et al.     |         |
| 7,193,123 | B2| * | 3/2007  | Stell et al.    | 585/652 |

* cited by examiner

*Primary Examiner*—N. Bhat
(74) *Attorney, Agent, or Firm*—Locke Lord Bissell & Liddell LLP; Alan B. Clement

(57) ABSTRACT

Methods and apparatus are disclosed for mixing fluid streams of different compositions to minimize fluid condensation inside a mixing vessel where the objective is to produce an all-vapor mixture product.

20 Claims, 1 Drawing Sheet

CONDENSATION REDUCTION IN FLUID MIXING

FIELD OF THE INVENTION

The present invention relates generally to improved methods for creating a vapor stream by mixing fluid streams of different compositions so as to reduce or minimize fluid condensation and possible related corrosion, and to a fluid mixing vessel specially designed for practicing the fluid mixing technology of this invention. The improved methods generally comprise the steps of introducing a hot vapor into an annular-shaped shell or baffle region surrounding a fluid mixing region at a point proximate to an outlet end of the mixing region, and thereafter flowing the hot vapor through the shell region to an inlet end of the mixing region before mixing the hot vapor with one or more fluids, which are typically cooler, flowing or being injected into the mixing region at the inlet end thereof. The baffle essentially shields the entire interior pressure wall of the mixing vessel from possible contacts with both the injected stream(s) and the fluid mixture in the core of the mixing vessel, while the hot vapor in the baffle region keeps the baffle hot enough to prevent condensation on the mixing region side of the baffle.

The methods and apparatus of this invention have particular utility in situations where the mixing of fluid streams at different temperatures can result in the condensation of a fluid that is highly corrosive to the surrounding environment. A particular application of the present invention, although the present invention is not limited to such application, is in mixing an alkali-containing fluid (liquid or vapor) with a steam feed stream to a catalyst-packed dehydrogenation reactor in conjunction with practicing the catalyst stabilization technology taught by U.S. Pat. Nos. 5,461,179; 5,686,369; 5,695,724 and 5,739,071, which patents are incorporated herein by reference.

BACKGROUND OF THE INVENTION

In chemical process operations, there are various instances in which it is desired to mix fluids at different temperatures, typically a vapor at the higher temperature with a liquid at the lower temperature, whereby the liquid is vaporized by contact with the hot vapor. Particularly where the liquid, when in liquid form, is highly corrosive to the surrounding environment, such as to vessel walls, valves, and the like, it is desirable to vaporize the liquid as quickly as possible and to reduce or minimize condensation that could cause corrosion of the equipment. One important application of these principles is in connection with the in-situ stabilization and/or regeneration of catalyst used in dehydrogenation processes.

For example, as described in U.S. Pat. Nos. 5,461,179; 5,686,369; 5,695,724 and 5,739,071, adding an alkali metal to the feed of a catalytic dehydrogenation reaction system can regenerate and/or stabilize the activity of the catalyst. A prime application of the basic process concept in the above patents is for the dehydrogenation of ethylbenzene to styrene in the presence of steam over a potassium promoted iron oxide catalyst. In this case, potassium is added to a reactor feed stream to improve both the conversion of ethylbenzene and the selectivity to styrene, as is described in the examples given in these patents. This potassium can be introduced either as potassium metal or a potassium compound such as potassium hydroxide (KOH). If metal is used, it can be introduced into the reactor feed as a solid, liquid (melting point 64° C.), or a vapor (normal boiling point 774° C.) and, when the potassium metal contacts the steam in the reactor feed, it converts to potassium hydroxide. If potassium hydroxide is used, it can be introduced as a solid, liquid (melting point 406° C.), or as an aqueous solution. No matter what the source of potassium, however, the potassium should be vaporized completely and mixed thoroughly with the reactor feed prior to the feed reaching the catalyst in the reactor for improved or optimum results.

Potassium metal is highly reactive; and thus, for safety reasons, potassium hydroxide will in many cases be preferred over potassium metal as the source of potassium in a commercial catalyst stabilization operation Compared with using solid or melted potassium hydroxide, aqueous potassium hydroxide solutions will in many cases be preferred because of the ease of handling an aqueous liquid at ambient temperatures.

One difficulty with using potassium hydroxide, however, is that it can be very corrosive, especially at elevated temperatures, either as an aqueous solution or as melted potassium hydroxide. Once the potassium hydroxide is fully vaporized and stays in the vapor phase, corrosion is typically much less of a problem If an aqueous solution is injected directly into the main process piping, then corrosion of the main process piping and equipment is possible. The KOH solution will contact the vessel walls because the short distances between solution injection point and the pipe walls typically will not allow adequate vaporization time before the potassium hydroxide, as solution, solid or liquid salt, reaches the walls. Furthermore, if the injection system is directly part of the main process piping, then the dehydrogenation process must be shut down if maintenance is required for the injection nozzle assembly.

To avoid damage and downtime for the dehydrogenation process unit, which is often a large and expensive process unit, we have found in accordance with this invention that it is advantageous to take at least a part of the steam being fed to the dehydrogenation process, vaporize the potassium hydroxide into it, and then mix this potassium-rich steam with the rest of the reactor feed. To vaporize the KOH solution, the potassium hydroxide solution can be sprayed into the steam portion inside a small, dedicated "mixing vessel," which can be shut down for periodic maintenance without shutting down the entire dehydrogenation process. If the mixing vessel and spray nozzle assembly are designed properly, the KOH solution droplets can be vaporized before the droplets reach the walls of the vessel or the vessel outlet pipe, thereby, at least in theory, reducing or minimizing corrosion caused by unvaporized solution However, in our experience of utilizing such systems, we have found that this approach is insufficient by itself to avoid significant corrosion of the mixing equipment.

Part of the problem of using potassium hydroxide in such applications is that its vapor pressure is low even at the high dehydrogenation reaction temperatures. At 598° C., which is the reactor inlet temperature of Example 1 in previously mentioned U.S. Pat. No. 5,461,179, for example, the vapor pressure of potassium hydroxide is only 10 pascals. If the total pressure is 100 kilopascals at this temperature, then the concentration of potassium hydroxide in the vapor phase cannot exceed 100 parts per million on a molar basis even at this high temperature. At 514° C., the saturation concentration would be only 10 parts per million on a molar basis. Thus, the potassium must be diluted by relatively large amounts of high-temperature steam to get the potassium totally into the vapor phase.

Even if the average conditions of the steam fed to the mixing vessel are adequate to vaporize the aqueous potassium hydroxide solution, however, we have found that the potassium hydroxide vapor can re-condense if the interior surface temperature of the mixing vessel walls is below the dew point of potassium hydroxide. Such condensation on the mixing vessel walls can cause severe corrosion because of the highly corrosive nature of liquid potassium hydroxide at the high temperatures needed for vaporization.

Although it might be expected that the temperature of the walls in such a mixing vessel would be nearly the same as that of the vapor passing through the interior, we have found that the wall temperature can be surprisingly colder than the average steam temperature. We attribute this to the following technical factors: 1) heat loss to the environment through the walls, even with a thick layer of external insulation, can be substantial; 2) heat loss is almost always even higher at vessel nozzles and supports and 3) heat transfer from the steam to the walls can be poor because of the low steam velocity resulting from the vessel volume and geometry needed for complete vaporization of the KOH solution without impinging droplets on the walls. We have determined that the differential temperature between the vapor in the interior of the mixing vessel and the wall of the vessel can be in the range of 50 to 100° C. for conventionally-designed vessels insulated according to industrial standards for energy conservation.

In practice, parts of the mixing vessel walls can be significantly colder than this at vessel support points and at vessel nozzles where heat loss can be greater and/or heat transfer from the process steam can be slower. For example, the temperature of a manway lid in such a vessel can be substantially colder than the walls of the main part of the vessel because there is no flow past the manway lid due to the fact that it is in a cul-de-sac. In contrast, the wall temperatures of regular cylindrical pipes usually will be close to the temperature of the contained fluid flow because the economic sizing of pipes typically results in significant fluid velocities, which result in good heat transfer and thus low temperature differences between the contained flow and the pipe wall.

We explored a number of possible approaches to try to solve this problem of condensation due to "cold" vessel walls using commercially available equipment and by adapting conventional technologies. As discussed below, none of these approaches proved to be entirely satisfactory.

First, we considered increasing the steam flow, which decreases the dew-point temperature of the potassium hydroxide vapor by diluting it and decreases the temperature drop somewhat of the steam through the system due to heat loss if the heat loss does not increase proportionally more than the increase in the steam flow. However, we determined that increasing the steam flow results in a proportionally larger mixing vessel so as to maintain the vessel residence time needed for droplet vaporization; heating costs for the overall process increase because heat losses are increased with the larger mixing vessel and larger diameters of the associated piping; and, even beyond the cost of making up for additional heat loss, the cost of heating for the overall process is larger because the efficiency of heating this small steam flow for the mixing vessel typically will be lower than for the dehydrogenation process. Thus, increasing the steam flow enough to make a significant difference in corrosion protection substantially increases both the capital and operating costs.

A second approach we considered was that perhaps the mixing vessel could be insulated more effectively to lower the heat loss and, thus, increase the vessel wall temperature. However, we determined that increasing insulation thickness results in diminishing returns; and, at high temperatures, heat loss still can be substantial even with thick layers of insulation. Also, heavily insulated nozzles and manways on vessels at high temperatures can be problematic because if the nozzle flange bolts are under the insulation and kept very hot (above about 565° C. for stainless steels) they become loose because of high temperature "creep" whereby the bolt metal permanently stretches because of the combination of tension imposed from tightening and temperature. Once they stretch, the bolts do not put sufficient force on the flanges to the vessel sealed. Therefore, there is an incentive to not heavily insulate the flanges, but this practice leads to high, localized heat losses and, thus, cold spots on the mixing vessel wall where condensation can occur.

A third approach we considered was to add electric heaters or electric tracing to the outside of the mixing vessel underneath the insulation. At temperatures above about 550° C., however, this approach leads to high cost with the technologies available. Furthermore, because heat loss is not uniform from the mixing vessel because of nozzles, vessel supports and insulation imperfections, control of the electric heaters would be complicated. The metal temperatures must be high enough at all points exposed to the potassium hydroxide vapor so as to avoid condensation, but care must be taken to avoid overheating the mixing vessel walls, which can lead to unacceptably low metal strength. Also, as discussed above, the bolts on the nozzle flanges on very hot equipment preferably should not be as hot as the vessel contents to prevent leakage due to high temperature creep. This approach therefore would result in either the nozzles being "cold" spots for condensation and corrosion or, alternatively, locations for increased risk of leakage, depending on whether or not the electric heaters apply heat in the area of the nozzle flanges.

A fourth approach we considered was to install an external jacket on the mixing vessel such that a hot utility stream could be passed through the jacket to warm the vessel. However, such a jacket would need to be designed for the high temperatures and the pressure of the utility fluid. It would be difficult or even impractical to adequately jacket nozzles including manways, even if this is considered to be desirable given the potential sealing problems at high bolt temperatures. Furthermore, for such systems as described above, the temperatures required exceed the highest condensing temperature for steam and the maximum operating temperatures for commercially available organic heat transfer fluids. Thus, the heat transfer fluid in an external jacket system most likely would need to be a molten salt or liquid metal, which are difficult to use, and this results in very high operating and capital costs.

A fifth approach we considered was that the steam supply temperature to the mixing vessel could be increased, which increases all of the mixing vessel temperatures and increases the difference between the mixture temperature and the dew point of the potassium hydroxide. However, there are metallurgical limits to how high the temperature can be. For temperatures up to 815° C. (1500° F.), various 300-series stainless steels can be used to construct pressure-containing vessels and pipes. At higher temperatures, however, more expensive metals must be used, and maintenance costs increase. In general, though, increasing the operating temperature up close to the limit of metallurgy is a reasonable approach to reducing or minimizing the necessary flow rate of the dilution steam.

A sixth approach we considered was that the mixing vessel wall metal could be upgraded to an alloy able to withstand, if possible, the corrosion caused by condensing potassium hydroxide. Because of the highly aggressive nature of potassium hydroxide at these high temperatures, however, the metal costs can become prohibitively expensive, which results in a large increase in capital cost for the mixing vessel. Furthermore, if the potassium hydroxide is allowed to condense, it will accumulate in the vessel, require periodic removal, and will not be fed to the reaction system as desired.

These and other deficiencies in or limitations of the prior art and the varied considered adaptations of more conventional technologies to try to address the condensation problem are overcome in whole or in part by the improved methods for condensation reduction of this invention and the related mixing vessel design

OBJECTS OF THE INVENTION

Accordingly, general objects of the present invention are to provide improved methods for creating a hot vapor stream by mixing fluid streams of different compositions so as to reduce or minimize vapor condensation and to provide a conceptual mixing vessel design suitable for practicing the methods of this invention.

A principal object of this invention is to provide an economic way to keep condensation from occurring on the walls of a mixing vessel, cooled by heat loss to the environment, where at least two streams, one stream (the dilution stream) being a hot vapor and at least one other stream (the injected stream) being either a pure-component liquid, liquid solution, solid-liquid slurry, vapor, or gas with suspended solids, are mixed to produce an all-vapor mixture that typically would be cooler than the dilution stream supply temperature. The potential condensable components either are in the injected stream(s) or are created by reaction between components from multiple streams when mixed.

A specific object of this invention is to provide a conceptual mixing vessel design for mixing fluids at different temperatures to create a vapor stream while reducing or minimizing condensation in the interior of the mixing vessel by flowing the typically higher temperature dilution stream through a baffle or shell region surrounding the central core of the mixing vessel and adjacent to the outer pressure wall of the mixing vessel prior to mixing the fluids.

A more specific object of this invention is to provide a conceptual mixing vessel design, and methods for using same, to effect the mixing of a potassium hydroxide solution with a steam feed to a catalyst-containing dehydrogenation unit while reducing or minimizing condensation of potassium hydroxide on the interior walls or other exposed surfaces of the mixing vessel in order to reduce or minimize corrosion.

Other objects and advantages of the present invention will in part be obvious and will in part appear hereinafter. The invention accordingly comprises, but is not limited to, the methods and related apparatus, involving several steps and the various components, and the relation and order of one or more such steps and components with respect to each of the others, as exemplified by the following description and accompanying drawing. Various modifications of and variations on the method and apparatus as herein described will be apparent to those skilled in the art, and all such modifications and variations are considered within the scope of the invention.

SUMMARY OF THE INVENTION

In general, this invention comprises a mixing vessel with an internal baffle that is essentially in parallel with the pressure-containing vessel wall creating a generally annular buffer or baffle region. The baffle shields virtually the entire interior of the vessel pressure wall from the fluid mixture in the center of the vessel, while the hot vapor in the annular baffle region maintains the internal baffle at a temperature high enough to prevent, at least substantially, condensation on the mixing region side of the baffle.

One embodiment of this invention is shown in FIG. 1. A dilution stream is introduced at one end of the vessel to the annular space between the baffle and the vessel wall. An injected stream enters a mixing region in the vessel interior from the opposite end of the vessel, and the injected stream is propelled towards the vessel outlet down the approximate centerline of the vessel. The dilution stream flows the length of the vessel in the annular space before mixing with the injected stream. The baffle ends just before it reaches the entry point of the injected stream, which may be at the end of a pipe extending into the vessel. The dilution stream is introduced to the mixing region in the vessel interior from the annular baffle region by flowing it around the entry point of the injected stream The dilution stream surrounds the injection stream at the entry point of the interior mix zone, and buffers temperature variations in the vapor mixture at the entry point at the interior baffle wall. The resulting vapor mixture flows the length of the vessel in a counterflow direction relative to the flow of the dilution stream through the baffle region and exits at the same end where the dilution stream had entered the baffle region. As the combined two streams flow through the core region of the mixing vessel, they mix and any changes in phase or reactions occur.

The present invention may be adapted to situations where there is more than one injected stream.

In most cases, it is expected that the injected streams will have less mass than the dilution stream, but this invention may be adapted to the opposite condition.

This invention applies to all operating pressures.

One embodiment of this invention involves a vessel where the baffle is a relatively thin internal vessel that can either welded to the pressure wall of the vessel or loosely connected.

Another embodiment of this invention involves a "jacketed" vessel where the annular baffle space is defined by two walls of similar thickness and the annular space is sealed except for the inlet and exit.

This invention is particularly useful for reducing or substantially eliminating condensation in situations where the condensable compounds are corrosive.

DETAILED DESCRIPTION OF THE PREFERRED EMBODIMENTS

Figure 1:
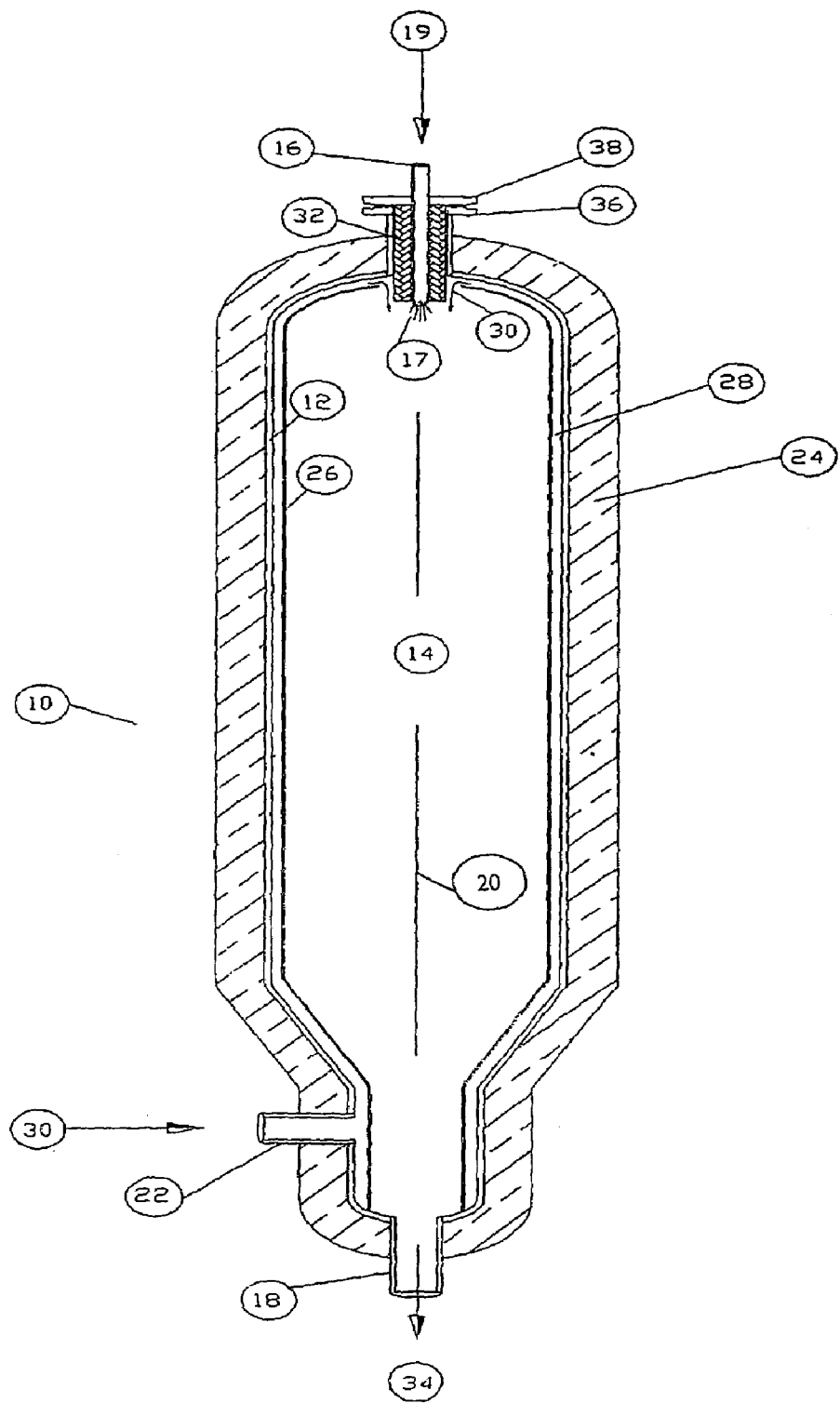
FIG. 1 is a schematic cross sectional view of an embodiment of a mixing vessel according to the present invention

One embodiment of a mixing vessel in accordance with the present invention is illustrated schematically in FIG. 1. The methods of this invention will be better understood by reference to the following description of FIG. 1, however, the invention should not be construed to be limited to the description of FIG. 1 in any manner whatsoever.

FIG. 1 is a schematic cross-sectional view of a mixing vessel/vaporizer 10 according to the present invention designed to reduce, minimize or eliminate, at least substantially, condensation in the interior of the vessel as well as around the fluid inlets and outlets. The condensation, which this invention is intended to reduce, minimize or eliminate, at least substantially, alternatively may be by a compound or compounds in the injected stream, or can be by one or more compounds that result from the chemical reactions of compounds in the various feeds to the mixing vessel. Mixing vessel 10, as shown in FIG. 1, comprises a generally cylindrical pressure- or vacuum-containing wall 12, preferably fabricated of a metal, such as steel, which defines a hollow region of fluid mixing zone 14 in the interior of the vessel.

Wall 12 is penetrated by a first fluid inlet 16 at a first (inlet) end of vessel 10 and a fluid outlet 18 at a second (outlet) end of vessel 10. In a preferred embodiment, fluid inlet 16 comprises a nozzle 17 or other fluid injection device, as are known to those skilled in the art, for injecting a fluid 19, such as a potassium hydroxide solution, into the mixing zone 14. In another preferred embodiment, fluid inlet 16 and fluid outlet 18 are approximately in axial alignment along the longitudinal centerline 20 through vessel 10.

Wall 12 also is penetrated by a second fluid inlet 22 located in proximity to fluid outlet 18, i.e., at or generally near the second (outlet) end of vessel 10. As shown in FIG. 1, fluid inlets 16 and 22 and fluid outlet 18 may comprise conduits extending through wall 12 or projections from wall 12. Also as shown in FIG. 1, in a preferred embodiment, wall 12 may taper to a smaller diameter cylinder at the outlet end. In another preferred embodiment of this invention, as shown in FIG. 1, wall 12 of vessel 10 is completely surrounded by a layer of insulating material 24, except possibly at the fluid inlets and outlet.

Mixing vessel 10 further comprises a baffle structure or inner wall 26, preferably fabricated of a metal such as steel, generally enclosing mixing zone 14 and spaced at least a small distance apart from the interior side wall of 12 so as to create a generally annular-shaped region or buffer zone 28 between the baffle 26 and the interior side of wall 12. As shown in FIG. 1, the baffle 26 may be connected to and supported in place by wall 12 at the outlet end of the vessel 10, outlet nozzle 18, or by other support members. Baffle 26 terminates just short of inlet 16. Second fluid inlet 22 is in fluid communication with buffer zone 28 such that hot vapor 30 can flow into buffer zone 28.

The operation of mixing vessel 10 in accordance with the present invention can now be understood. A hot vapor 30, such as steam, is flowed through fluid inlet 22 into buffer zone 28 near the outlet end of vessel 10. Hot vapor 30 then flows through buffer zone 28 toward the inlet end of vessel 10 in a generally counterflow direction relative to the flow of combined fluid through mixing zone 14. Baffle 26 is a barrier that effectively separates the contents of mixing zone 14 from the interior of wall 12 thereby protecting the interior of wall 12 from any corrosive condensate. At the same time, the flow of hot vapor 30 through buffer zone 28 maintains baffle 26 at a temperature high enough to reduce or prevent condensation on the mixing zone side of baffle 26.

The following temperature conditions must be satisfied in accordance with this invention: 1) the dew point of the dilution stream must be below the dew point of the combined mixture; 2) the equilibrium mixture temperature (assuming homogeneous mixing of the fluid streams) must be above the dew point of any compound that must be kept in the vapor phase and 3) the temperature of the dilution stream in buffer zone 28 must also be above the dew-point temperature of the mixture. It is expected that in most cases the dilution stream will be both hotter and larger in flow relative to the injected stream or streams, but the present invention can be adapted to accommodate situations where the injected stream(s) are hotter and/or larger in flow.

At the inlet end of vessel 10, baffle 26 terminates just before inlet 16. In a preferred embodiment, an insulated sleeve 32 surrounds inlet conduit 16 and terminates in a nozzle 17. As the flow of hot vapor 30 passes through nozzle 17, the lower temperature fluid 19 is injected into the hot vapor 30 where it is entrained, mixed with vapor in mixing zone 14, and any phase changes from liquid and/or solid to vapor occurs. At the outlet end of vessel 10, mixed vapor 34 from mixing zone 14 flows out of vessel 10 through outlet 18.

As shown in FIG. 1, the mixing vessel of this invention normally would be cylindrical as is typical in industrial designs. Mixing vessels having other shapes and geometries, however, such as spherical or rectangular, also are within the scope of this invention. Also, in accordance with this invention, the orientation of the mixing vessel may be horizontal, vertical, diagonal or any other orientation.

In still another embodiment of this invention, the dilution stream may be introduced to an annular space around a smaller-diameter outlet end of vessel 10 as shown in FIG. 1. This smaller-diameter annular space helps to distribute the hot dilution stream to the rest of the baffled space.

The present invention addresses many, if not all, of the problems of the prior art fluid mixing techniques and has many advantages compared with the prior art techniques.

1. Because the temperature of the baffle will, in most cases, be between that of the dilution stream and the combined mixed stream, condensation on the baffle does not occur, or is substantially reduced, because the temperature of the dilution stream is higher than the dew point of the combined stream in the mixing region. The heat flowing to the environment through the vessel wall and insulation is supplied by the incoming dilution stream instead of being taken from the combined stream that contains the compound or compounds that can condense and possibly cause corrosion.

2. If corrosion does occur, it will only affect the baffle, which can be replaced at a lower cost than replacement of the entire vessel.

3. If the baffle corrodes, it does not result in a safety hazard, whereas corrosion on the vessel wall could result in hot and/or corrosive vapors being released to the environment.

4. The temperature of the baffle wall generally will be fairly uniform because the baffle temperature mostly is determined by the temperatures of the incoming dilution stream and of the mixture stream which are both above the dew points of compounds in the mixture stream, and is not affected much by localized low temperatures of the mixing vessel wall caused by insulation imperfections, nozzles, vessel supports and other attachments. Therefore, cold spots that could result in condensation virtually are eliminated. The temperature of the baffle can be increased by narrowing the annular space to increase dilution stream velocities, which will improved heat transfer from the dilution stream to the baffle, at a cost of higher dilution stream pressure drop.

5. Because of the complicated geometry of nozzles and vessel attachments, predicting localized metal temperatures has a high degree of uncertainty n an unmodified, mixing vessel. By contrast, the baffle system of this invention reduces or minimizes the uncertainty about the temperatures of the surfaces that are exposed to the combined stream.

6. One embodiment of this invention is to make the baffle out of a highly corrosion-resistant metal, which is economically feasible because the baffle can be relatively thin compared to the mixing vessel wall because the baffle needs to be designed for only minimal differential pressures. To provide the same protection for the vessel wall would require either that the entire vessel wall, which must be thick enough for the design pressure at the design temperature, be made of the corrosion-resistant metal, or else the vessel must be clad with the corrosion-resistant metal, which also is very expensive.

7. With the baffle system of this invention, manways and certain other nozzles can be internally insulated, which reduces heat loss, thus reducing operating costs, and also lowers the temperature of the nozzle bolts, which reduces the risk of leakage at the flanges. Without the baffle, internal nozzle insulation is problematic because such insulation would be difficult to seal from the vessel fluids. If there are condensable compounds in the vapor next to the interior of the nozzle, then these compounds will diffuse through or around the insulation to the cold nozzle end where condensation, and possibly corrosion, would occur.

8. In comparison with increasing the dilution stream flow, adding an internal baffle reduces the size of the mixing vessel and reduces the cost of utilities.

9. In comparison with adding more insulation, the baffle approach effectively eliminates the problem whereas adding insulation in most cases only reduces it.

10. In comparison with adding electric heaters to the outside of the vessel, adding a baffle reduces cost, simplifies the installation and provides a passive solution to the condensation problem without high-temperature wiring and the need for multiple temperature controllers that require maintenance.

11. In comparison with an external heating jacket, the baffle approach is far more economic at high temperature because an external heating jacket requires an external heater and heat transfer fluids, which depending on the temperatures, may be exotic.

12. In comparison with upgrading the metallurgy to resist the corrosion resulting from condensation, the baffle can reduce the cost of materials and avoid the accumulation of condensed material, which should be in the mixed outlet stream, in the mixing vessel.

The following example will illustrate the practice of this invention The example, however, should not be construed to limit the appended claims in any manner whatsoever.

EXAMPLE

Steam is to be mixed with a potassium hydroxide stream at a pressure of 200 kilopascals absolute. The equilibrium mixture temperature is 700° C. after accounting for heat losses and the heat required to heat the potassium hydroxide stream. If a mix vessel for this mixing step was designed in accordance with conventional practice, rather than according to this invention, and assuming the coldest part of the vessel wall is 600° C. because of heat loss and heat transfer limitations from the mixture to wall, then the maximum amount of potassium hydroxide that could be injected would be 5.3 g-moles of KOH per 100 kg-moles of steam This limitation is imposed by the vapor pressure of potassium hydroxide at 600° C.

By contrast, if this same fluid mixing step was carried out in a mixing vessel designed and operated in accordance with the present invention, then the metal exposed to the potassium hydroxide vapor could be no colder than the outlet mixture stream temperature of 700° C., which gives a much higher limit of 46.7 g-moles of KOH per 100 kg-moles of steam that can be added. Thus, based on a constant residence time for the combined stream, the mixing vessel volume can be approximately nine times smaller by using a baffle system design in accordance with this invention.

It will be apparent to those skilled in the art that other changes and modifications may be made in the above-described apparatus and methods for mixing fluids at different temperatures without departing from the scope of the invention herein, and it is intended that all matter contained in the above-description shall be interpreted in an illustrative and not a limiting sense.

The invention claimed is:

1. An apparatus for combining two or more streams that when mixed produce a vapor stream containing one or more components that can condense to form liquids and/or solids at temperatures above ambient, said apparatus comprising:
   a vessel having an outer wall;
   a baffle wall located within said vessel and in proximity to said outer wall to create an annular space between said baffle wall and said outer wall for receiving at least one dilution stream,
   a vessel interior space within said baffle wall for containing a combined stream;
   at least one dilution stream inlet extending through said outer wall for delivering said dilution stream into said annular space;
   at least one dilution stream outlet for delivering said dilution stream from said annular space to said vessel interior space;
   at least one injection fluid stream inlet extending through said outer wall and said baffle wall for delivering an injection stream to said vessel interior space and mixing said injection fluid stream with said dilution stream to form a combined stream in said vessel interior space; and
   at least one combined vapor stream outlet extending through said outer wall for delivering said combined vapor stream from said vessel;
   wherein said dilution stream inlet delivers a dilution stream comprising a vapor having a dew-point temperature that is less than that of said combined vapor stream and delivers said vapor to said annular space at a temperature above the dew-point temperature of said combined vapor stream.

2. An apparatus as defined in claim 1 wherein said vessel is cylindrical in shape.

3. An apparatus as defined in claim 1 wherein said injection stream inlet is located at an opposite end of said vessel relative to said mixed vapor stream outlet.

4. An apparatus as defined in claim 3 wherein said injection stream inlet further is located along a vessel centerline.

5. An apparatus as defined in claim 1 wherein said injection stream inlet includes a nozzle.

6. An apparatus as defined in claim 1 wherein said baffle wall opening for delivering said dilution stream from said annular space to said combining space is located in proximity to said injection stream inlet.

7. An apparatus as defined in claim 1 wherein said baffle wall is connected to said vessel wall in proximity to said mixed vapor stream outlet.

8. An apparatus as defined in claim 1 wherein the exterior of said vessel is provided with insulation.

9. An apparatus as defined in claim 5 wherein an interior injection stream inlet pipe leading to said nozzle is insulated.

10. An apparatus as defined in claim 3 wherein said outlet end of the vessel is tapered to a narrower diameter.

11. A process for combining two or more streams that when combined produce a combined vapor stream containing one or more components that can condense to form liquids and/or solids at temperatures above ambient, said process comprising:
   (a) delivering at least one dilution stream at a first temperature into an annular space in a vessel between the vessel wall and a baffle and allowing said dilution stream to flow through said annular space to a baffle wall opening and into an interior combining space, said dilution stream comprising a vapor having a dew point temperature that is less than the temperature of a final combined vapor stream wherein said first temperature is above the dew point of said combined vapor stream (b) delivering at least one injection stream at a second temperature into said interior combining space;

(c) combining said dilution stream with said injection stream in said interior combining space to form said combined vapor stream at a final combined stream temperature; and (d) withdrawing said combined vapor stream from said interior combining space through a vessel outlet.

12. A process as defined in claim 11 wherein said dilution stream is delivered to one end of said vessel and flows through said annular space to said baffle wall opening and countercurrent to said combined vapor stream.

13. A process as defined in claim 12 wherein said baffle wall opening is located in proximity to the point of delivery of said injected stream.

14. A process as defined in claim 11 wherein said dilution stream is superheated steam and the injected stream is a liquid.

15. A process as defined in claim 14 wherein said injected stream is a liquid, aqueous solution comprises an ionic alkali metal.

16. A process as defined in claim 15 wherein said ionic alkali metal comprises potassium.

17. A process as defined in claim 11 wherein said dilution stream contains a component that is reactive with a component contained in said injected stream.

18. A process as defined in claim 11 wherein said injected stream comprises a pure-component liquid, liquid solution, solid-liquid slurry, vapor, or gas with suspended solids.

19. An apparatus for combining two or more streams that when mixed produce a liquid stream containing one or more components that will condense to form solids at temperatures above ambient, said apparatus comprising:

a vessel having an outer wall;

a baffle wall located in within said vessel and proximity to said outer wall to create an annular space between said baffle wall and said outer wall for receiving at least one dilution stream;

a vessel interior space within said baffle wall for containing a combined stream;

at least one dilution stream inlet extending through said outer wall for delivering said dilution stream into said annular space;

at least one dilution stream outlet for delivering dilution stream from said annular space to said vessel space;

at least one injection fluid stream inlet extending through said outer wall and said baffle wall for delivering an injection stream to said vessel interior space and mixing said injection fluid stream with said dilution stream in said vessel interior space; and at least one combined stream outlet extending through said outer wall for delivering said combined stream from said vessel;

wherein said dilution stream inlet delivers said dilution stream comprises a dilution stream liquid having an initial solidification point temperature that is less than that of the combined stream and delivers said liquid to said annular space at a temperature above the initial solidification point temperature of said combined stream.

20. A process for combining two or more streams that when combined produce a combined liquid stream containing one or more components that will condense to form solids at temperatures above ambient, said process comprising:

(a) delivering at least one dilution stream at a first temperature into an annular space in a vessel between the vessel wall and a baffle and allowing said dilution stream to flow through said annular space to a baffle wall opening and into an interior combining space, said dilution stream comprising a liquid having an initial solidification point temperature that is less than the temperature of a final combined liquid stream wherein said first temperature is above the initial solidification point temperature of said combined liquid stream;

(b) delivering at least one injection stream to said interior combining space;

(c) combining said dilution stream with said injection stream in said interior combining space to form said combined liquid stream; and (d) withdrawing said combined liquid stream from said interior combining space through a vessel outlet.

* * * * *